United States Patent [19]

Briggs et al.

[11] Patent Number: 4,649,471

[45] Date of Patent: Mar. 10, 1987

[54] ADDRESS-CONTROLLED AUTOMATIC BUS ARBITRATION AND ADDRESS MODIFICATION

[75] Inventors: Willard S. Briggs, Carrollton; Alan D. Gant, Dallas; Parveen K. Gupta, Carrollton; Isadore S. Ferson, Austin, all of Tex.

[73] Assignee: Thomson Components-Mostek Corporation, Carrollton, Tex.

[21] Appl. No.: 471,095

[22] Filed: Mar. 1, 1983

[51] Int. Cl.⁴ .......................................... G06F 13/18
[52] U.S. Cl. .................................................. 364/200
[58] Field of Search ............................. 364/200, 900

[56] References Cited

U.S. PATENT DOCUMENTS 3,292,151 12/1966 Barnes et al. ........................ 364/200
4,153,933 5/1979 Blume, Jr. et al. .................. 364/200
4,155,118 5/1979 Lamiaux .............................. 364/200
4,200,919 4/1980 Page et al. ........................... 365/189
4,393,443 7/1983 Lewis .................................. 364/200
4,481,570 11/1984 Wiker ................................. 364/200

Primary Examiner—Gareth D. Shaw
Assistant Examiner—Daniel K. Dorsey
Attorney, Agent, or Firm—Roland Plottel

[57] ABSTRACT

A microcomputer includes I/O ports and registers which are mapped in memory space along with RAM and ROM and in which hardware invisible to the programmer performs a bus arbitration sequence to acquire an external bus when an off-chip reference requires the bus; and in which memory space that is used for on-chip references is recovered for use in external memory by manipulating bits in the memory address.

4 Claims, 5 Drawing Figures

ADDRESS-CONTROLLED AUTOMATIC BUS ARBITRATION AND ADDRESS MODIFICATION

CROSS REFERENCE

Copending application Ser. Nos. 454,800, filed Dec. 30, 1982, now abandoned, the continuation of which is Ser. No. 783,261, filed Oct. 3, 1985 and Ser. No. 454,799, filed Dec. 30, 1982, now U.S. Pat. No. 4,609,985.

TECHNICAL FIELD

The field of the invention is that of a microcomputer having a single chip with a CPU in which there are both on-chip and off-chip address references.

BACKGROUND ART

It is known in the field of micro and minicomputers to connect different computers or central processing units by means of data and address buses. In the case where two or more microprocessors share a bus, it is necessary to have some arbitration scheme to allocate control of the bus at any particular time. It is also known to make references within a single board microcomputer and also to make external references on a shared bus off that board. One commercial example is that of the Intel single board computer, in which each single board computer can operate on-board and is able to request a shared bus whenever it needs to make an access to other single board computers.

A problem with these devices is that it is necessary to indicate in some way whether a memory address is on-board or off-board and this indication takes computer code and time in the execution of the instructions.

DISCLOSURE OF INVENTION

The invention relates to a microcomputer in which I/O ports and registers are mapped in memory space along with on-chip RAM and ROM and in which hardware invisible to the programmer or user-transparent recognizes an off-chip reference and sets in motion a bus arbitration sequence.

A feature of the invention is that, since the mapping of the I/O in memory space reduces the amount of memory available below that determined by the number of bytes in the machine, the lost amount of memory is recovered by substituting for those bits which flag an external reference a corresponding set of bits determined by the programmer.

BEST MODE FOR CARRYING OUT THE INVENTION

The subject invention was made in the course of developing a family of microcomputers for Mostek Corporation of Carrollton, Tex. and further information may be found in the publication, "MK68200 Principles of Operation", Version 2.1, dated July 1982 and available from Mostek Corporation, 1215 West Crosby Road, Carrollton, Tex. 75006, which manual is incorporated by reference. This family of microcomputers was designed with an eye to providing great flexibility of system operation and may be used as: (a) a single chip microcomputer having on-chip ROM and RAM with generalized I/O or (b) in a "partial expansion" mode in which there is both on-chip ROM and RAM and off-chip ROM and RAM, or (c) in a "full expansion" mode in which there is on-chip RAM and off-chip ROM and/or RAM. The off-chip memory is connected by a local bus and the invention relates to a mechanism which permits the mixing of on-chip and off-chip address references without any difference in the coding.

Figure 1:
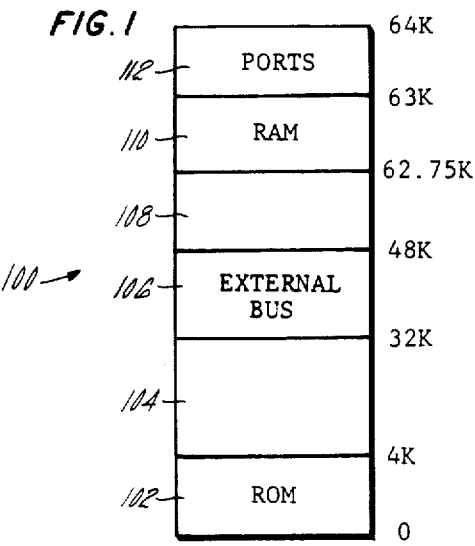
FIG. 1 illustrates schematically the memory map of a microcomputer constructed according to the invention.

In this family of microcomputers, the input/output devices and other registers used as ports are mapped in memory space. The machine uses a 16 bit word so that the address range available is 64K (65,536) bytes. A map of the memory space is shown in FIG. 1, indicated generally by the number 100. Memory addresses 0–32K are used for ROM. In a particular embodiment section 102, or 4K, is used for on-chip ROM and section 104 is reserved for future expansion. Section 106 of the map, occupying addresses from 32K–48K, is used as a window for external memory or input/output. The range from 48K–62.75K, indicated as 108 in the diagram, is reserved for future expansion of RAM and section 110, having the range from 62.75K–63K, is used as RAM in this embodiment. Section 112, having the range from 63K–64K, is used for ports containing all the input/output of the computer. The use of memory mapping has advantages that will be described below, but it has one particular drawback in that the 64K space available from the 16 bit word is not as efficiently used as it could be and there are less than 64K addresses that are actually available.

When the computer is used in a single chip configuration and there are no external memory addresses, this invention does not apply. In the case where there is external memory, there is available only a 16K window in section 106, not the full 64K range.

This family of microcomputers is expected to be used in applications such as controlling a disc drive or controlling a video terminal which are input/output intensive and therefore it is advantageous to make the input/output code efficient so as to conserve valuable memory space.

Figure 2A:
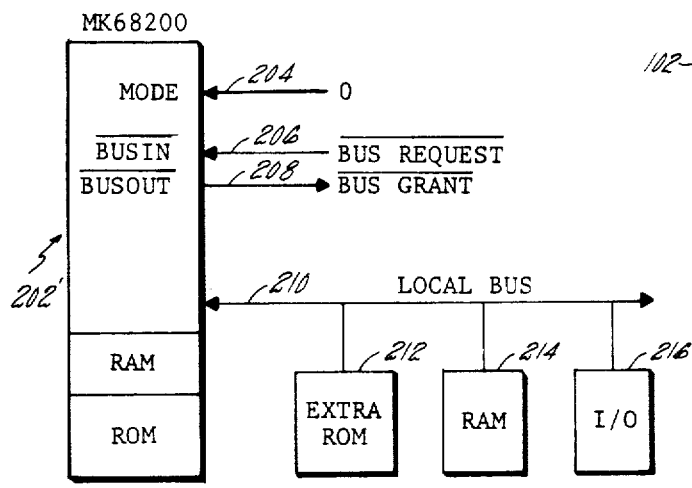
FIG. 2A illustrates schematically a system including a microcomputer and a local bus which ascesses off-chip memory.

Two sample microcomputer configurations are shown in FIG. 2, in which FIG. 2A shows a partial expansion mode, indicated by the "0" on pin 204, in which there is on-chip ROM as well as on-chip RAM and also a local bus 210 which is a 16 bit bus accessing additional ROM 212, additional RAM 214 and input/output 216. The bus is controlled by two signals—request 206 and bus grant 208 and the mode of operation (the external bus mode) is controlled by an external signal applied to mode pin 204. In this configuration, microcomputer 202 is the bus grantor (sometimes referred to as bus master).

Figure 2B:
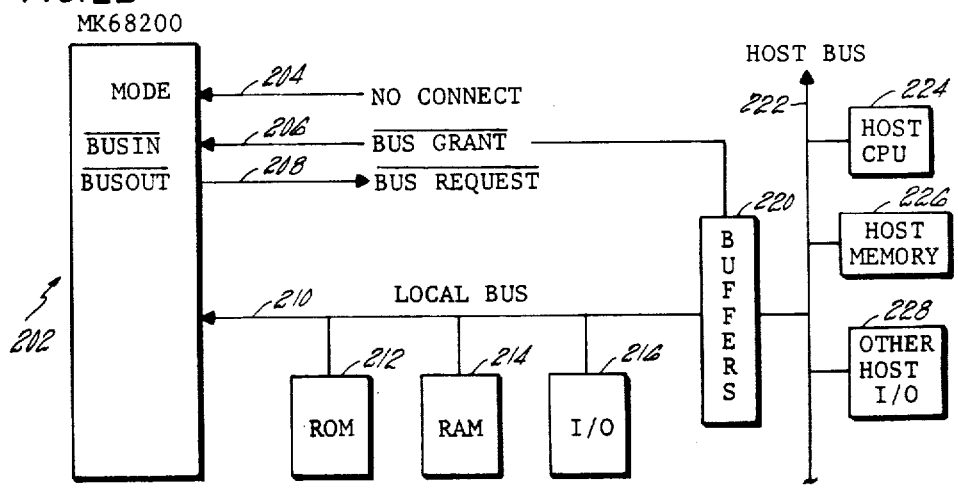
FIG. 2B illustrates a microcomputer with a local bus accessing off-chip memory and connected by a buffer to a host bus which is controlled by a host CPU.

FIG. 2B illustrates an alternative full-expansion configuration, indicated by "no connect" on pin 204 in which there is no on-chip ROM, local bus 210 and the local memory are as before and there is added a bidirectional buffer 220 and an additional bus 222 coupling the microcomputer to host CPU 224 along with a host memory 226 and other host input/output devices 228. In this configuration, the host CPU will be bus grantor and it will be necessary for computer 202 to send a bus request on line 208 and to wait for a bus grant signal to come on line 206 before data can be transferred out of local bus 210. When the host CPU is ready to grant access to host bus 222, it sends a signal to buffer 220 to couple the two buses and also sends the bus grant signal to microcomputer 202. The same set of pins will serve for local bus 210 and for host bus 222—an advantageous feature.

When computer 202 addresses devices on the local bus, the fact that it is in the "slave" configuration does not cause any difficulty. Since there is no other processor on the bus, there is no need for a bus grant or request. When the system is set up, ROM 212, RAM 214 and I/O 216 are given addresses in memory space that are outside the 16K DMA (Direct Memory Access) window (from 32K–48K in FIG. 1) and the CPU treats them as on-chip; i.e., the bus control features are neither needed nor used.

Within microcomputer 202 there are at least two buses: an address bus which takes addresses from the CPU to the on-chip ROM and RAM and to the external bus; and an address/data/interrupt port bus which takes data addresses and interrupts from the CPU to the ports. This port bus also handles all the input/output. There is also an external bus 210 which extends from the pins associated with the input/output port to the outside world.

Figure 3:
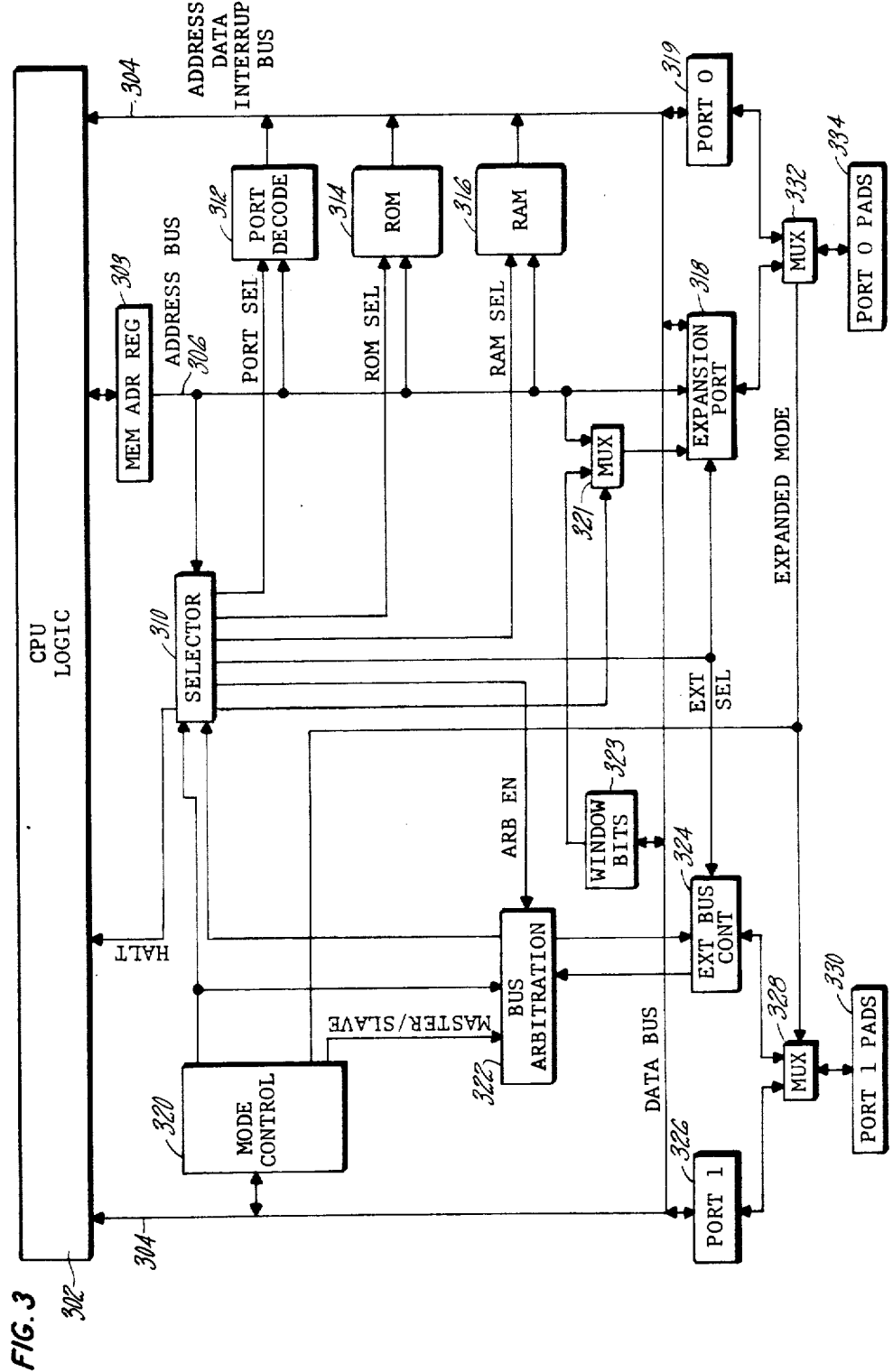
FIG. 3 illustrates schematically a portion of the CPU of a microcomputer constructed according to the invention.

The operation of the invention may be understood with reference to FIG. 3 which shows schematically a portion of the CPU of microcomputer 202 and also selected ports and memory units. The bulk of the CPU is indicated by block 302 in the figure which contains the ALU unit, the microcode and the memory controller unit.

In this computer, the instructions are pre-fetched so that, at the beginning of the execution of the Nth instruction, the address of the (N+1)th instruction is residing in memory address register 303 which is in communication with the remainder of the CPU 302. Memory address register 303 is connected to 16 bit address bus 306 which is in contact with selector 310 which will be described in more detail below, a port decoding unit 312, the on-chip ROM 314, the on-chip RAM 316, multiplexer 321 and ports 318 and 324. Selector 310 includes a decoder that inspects the contents of address register 303 on every instruction. If the address is within a designated area of memory, selector 310 enables the corresponding hardware, i.e., if the address is within ROM, ROM 314 is enabled by a signal from selection 310. Only the address of a memory location goes across bus 306. The actual data goes across bus 304 an address/data/interrupt bus, the operation which is described in copending application Ser. No. 783,261 and which is incorporated by reference. Bus 304 communicates with port decode circuit 312, ROM 314, RAM 316 and a number of ports 318, 319, 324 and 326 as well as mode control 320.

In operation, selector 310 responds to an address within memory address register 303, such as a ROM address, and generates a ROM enabling signal which goes to ROM 314. The address also goes to ROM 314 on bus 306. The data output from the ROM goes on bus 304 back to the remainder of the CPU. The same procedure is followed for the on-chip RAM. In the case of input/output, selector 310 responds to the address and sends a signal to port decoder 312 which also reads the memory address and generates from the 16 bit memory address, a 6 bit port address which it places on bus 304. Port 319 responds to that address and accepts the data which subsequently travels across bus 304 and is latched into the port. In the particular case where the data is general input/output information, multiplexer 332 passes the data from the port 319 register to the port pins 334, and port 318 is not used. This mode of operation may be typically used when the computer is a single chip computer controlling a peripheral unit in a larger computer system, say, and the data passes to and from the peripheral and to and from a host computer.

In the case where the operation is a read from an external memory, the address travels on bus 306 directly into expansion port 318, which is shown as a separate logic unit in FIG. 3 but is physically intermingled with port 319. The address passes through the port and through multiplexer 332 to the pads as soon as the bus is available, so that external memory will have time to decode the address and respond in the shortest time.

When the computer is in one of the expanded modes that accesses external memory through the DMA window referred to above, multiplexers 328 and 332 pass signals from register 324 and expansion port 318, respectively, to the pads, and the general input/output ports 326 and 319 are not used.

It is necessary when two or more processors share a bus, that one be bus grantor and the others must request access to the bus. Mode control 320 is set by the user during power-up to determine whether microcomputer 202 is to be bus grantor or bus requestor and this signal is sent to selector 310. A master/slave (grantor or requestor) signal is also sent to bus arbitration unit 322 which receives a signal also from selector 310 when the external bus is needed. If microcomputer 202 is a bus requestor and it wishes to send data to a host computer, then bus arbitration unit 322 will send a signal to external bus control register 324 which, in turn, passes through multiplexer 328 on to pads 330. Selector 310 will meanwhile send a halt signal to the CPU that halts the CPU until a bus grant signal has been received on another one of pads 330 and the data transfer operation has been completed. This sequence of events will be followed whenever an external reference is made through the DMA window.

The operation of mode control unit 320 is discussed in more detail in copending application Ser. No. 454,799. It responds to a signal during reset that determines whether the CPU will be a bus grantor or bus requestor. The memory expansion mode; single chip, external ROM, only, or both internal and external ROM is determined during the power-on initialization sequence. As is discussed in copending application Ser. No. 471,079, the memory expansion mode may be changed during the course of executing a program.

Figure 4:
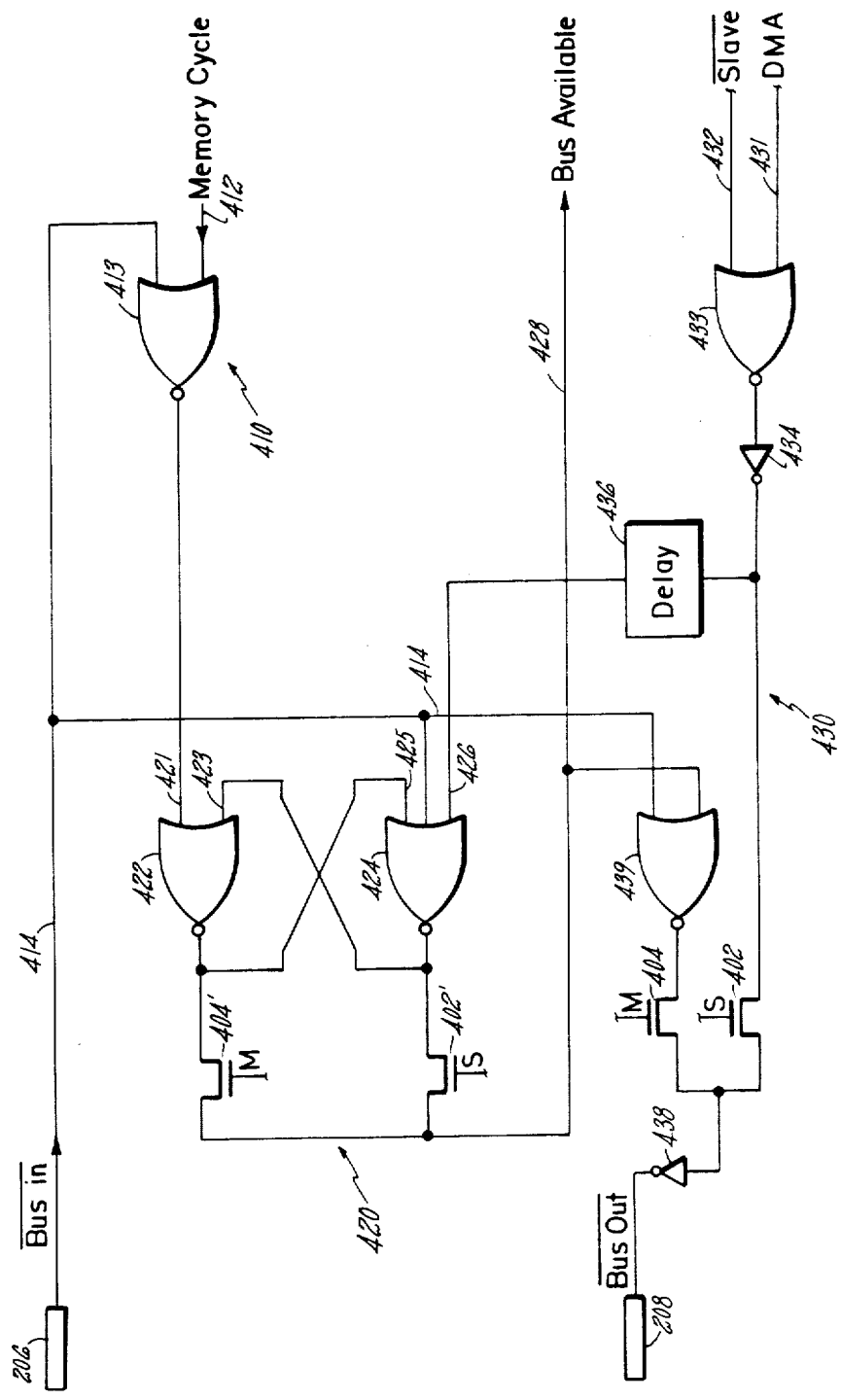
FIG. 4 illustrates schematically one of the circuits shown in FIG. 3.

FIG. 4 illustrates a simplified form of bus arbitration unit 322. Unit 410 receives a signal from selector 310 on line 412 and a $\overline{\text{BUSIN}}$ signal on line 414, coming from pin 206. The output of unit 410 passes to unit 420, which effectively latches control of the bus, and the output of which returns to selector 310 to indicate that the bus is available. Unit 430 drives the $\overline{\text{BUSOUT}}$ signal on pin 208. It is convenient to discuss separately the operation of the circuit in the case where the CPU is master or slave.

When the CPU is bus slave, a DMA signal on line 431, indicating that memory address register 303 contains an address register in the 16K DMA window, initiates the cycle. NOR gate 433 responds to that input and to a $\overline{\text{SLAVE}}$ signal on line 432, indicating that the CPU is bus requestor. The output of gate 433 is inverted in inverter 434 and passes through mode transistor 402 (mode transistors 402 and 404 open paths for signals when the CPU is bus requestor or grantor, respectively), and through inverter 438 to pin 208. The $\overline{\text{BUS OUT}}$ signal in this case is a bus request and the BUS AVAILABLE signal on line 428 must wait for a bus grant signal on $\overline{\text{BUSIN}}$ (line 414). The $\overline{\text{BUSIN}}$ signal combines with the external memory cycle signal on line 412 in NOR gate 413 and also passes directly to NOR gate 424. The output of NOR gate 413 passes to NOR gate 422 along line 421. NOR gate 424 has one further input—a delayed bus request signal passing from delay unit 436 along line 426.

NOR gates 422 and 424 are cross-coupled on wires 423 and 425 to latch the control signal until reset. Mode transistors 402' and 404', used for the slave and master modes, respectively, pass the bus acquisition signal to line 428. The mode transistors respond to master/slave signals that are generated in conventional circuitry. The signal on line 428 returns to selector 310, as stated above, to indicate that the bus is available.

When the CPU is bus master, it normally has control of the bus and no signal need be asserted. If another device is using the bus, at the time of initiation of the external memory cycle, the $\overline{\text{BUSIN}}$ input to NOR gates 413 and 424 prevents the shared bus enable signal on line 428 from initiating the data transfer until the external device that is using the bus releases it.

In the case when the CPU is bus master and an external device requests the bus, the request on $\overline{\text{BUSIN}}$ will combine in NOR gate 439 with the normally low state of line 428 to form the bus grant signal.

In summary, bus arbitration unit 322 receives an input signal from mode control unit 320 that determines whether the CPU is to be bus grantor or requestor. That signal is transmitted during the power-up period, in response to voltage on one of pads 330. The expansion mode (full or partial) is selected during reset, but may be changed during system operation by altering selected bits in port 15 by the bit manipulation instructions. When an external reference is decoded in selector 310, bus arbitration unit 322 is enabled and asserts a bus request if the CPU is bus requestor or checks to see if a peripheral has control of the bus if the CPU is the bus grantor. If the bus is not available, a halt signal stops the CPU until the bus is free. This sequence is invisible to the programmer or user-transparent who, in the case of other microcomputers, must code in the bus control sequence.

As can be seen in FIG. 1, the use of memory mapping for the ports and the external references has reduced the available memory range. Effectively, some bits of the 16 bit address have been used as flags to indicate whether the data is to be sent to a port or to an external memory. In the case illustrated here, where 16K of memory space has been reserved for external access, only 16K, instead of the full 64K, is available for the external memory 214 and 212. The full memory range of 64K is recovered by substituting the two flag bits which, in this particular case, are bits 14 and 15 of the memory address.

When the system is in a partial expansion mode and there is external memory included as part of the memory address space, then signals are sent by mode control 320 and also by selector 310 to multiplexer 321. Control 320 tells the multiplexer that there is external memory in the system and selector 310 tells the multiplexer that this particular address is going to go to that external memory. Multiplexer 321 receives the two replacement bits from window bit register 323 and substitutes them for the high order bits in the address which is present on bus 306. The new bits are transmitted to expansion port 318 where they replace the old bits. The new address is then transmitted out to the pads 334 through multiplexer 332.

By means of this substitution, the programmer is able to change the window bits within unit 323 during the course of his program. He may, therefore, mix on-chip and off-chip references without any coding on his part so long as the off-chip references are within a 16K window determined by the two bits in unit 322. If he wishes to expand beyond the 16K window then he will change the bits in unit 323 by means of the bit operation instructions. This system differs from memory segmentation and expansion, which is conventional in minicomputers, where programmers wish to access a greater address space than is provided by the number of bits in the word. In this case, the address space accessed is the same 64K that is provided by the 16 bits in the word. No additional memory has been gained.

With this invention, the maximum memory that may be addressed by computer 202 is the 64K of external memory passing through the window on to the external units 212 and 214 plus on the on-chip or off-chip local memory which may be a maximum of 47K+1K of on-chip ports.

We claim:

1. A memory-mapped microprocessor integrated on a single chip including an on-chip memory and a plurality of on-chip input/output ports, adapted for connection to an external bus (210, 222) and thence to at least one off-chip memory, and having means for addressing a memory address space (100) that includes:
   a memory address range for on-chip memory (102, 104, 314, 316),
   a memory address range (106) for any off-chip memory (212, 214) and
   a memory address range (112) for off-chip references, passing through on-chip input/output ports (318, 319, 324, 326) when use of said external bus is requested, comprising on said chip
   a CPU (Central Processing Unit) (202, 302);
   at least one input/output port (318, 319, 324, 326);
   an on-chip memory (102, 104, 314, 316);
   at least one register (303) for storing an address in said memory address space;
   a plurality of signal lines (304, 306) interconnecting said CPU, port, said on-chip memory and said memory address register (303);
   a microprocessor selection means (310) connected to an output of said memory address register (303);
   a memory expansion mode control (320), whose mode can change, during the course of a program by execution of a predetermined instruction thereof, to select which of said on-chip memory and said off-chip memory is addressed, thereby obviating delays due to external bus requests when only on-chip memory is addressed, said memory expansion mode control being connected to said selection means (310) and means (324) for controlling an external bus (210, 222) connected to said selection means (310) and to said at least one input/output port, said microprocessor selection means (310) automatically testing a memory address stored within said register (303) to determine whether said address indicates an off-chip reference and hence requires use of said external bus, and responding to memory addresses within a predetermined off-chip range (106) by activating an on-chip bus control circuit (322, 410, 420, 430) which, in turn, arbitrates use of said external bus (210, 222), thereby permitting a user to mix on-chip and off-chip references without coding specific bus control instructions.

2. A microprocessor according to claim 1, in which said selection means (310) transmits an enable signal to an on-chip bus arbitration circuit (322, 410, 420, 430) that, in turn, places a signal on an external bus control pin (208); and in which, after said microprocessor has control of said external bus (210, 222), said selection means (310) transmits a signal to said at least one port to transfer said address from one (304) of said internal on-chip signal lines (304, 306) to pins connected to said external bus (210, 222).

3. A microprocessor according to claim 2, in which said selection means (310) responds to a predetermined set of bits within said address in said memory address register (303), whereby a range of addresses (106) in memory space, defined by said predetermined set of bits, is reserved for off-chip references.

4. A microprocessor according to claim 3, in which said predetermined set of bits is determined by a particular bit pattern in a programmable register (323), whereby said reserved range of off-chip references may be altered during program execution.

* * * * *